United States Patent
Kawakami et al.

(10) Patent No.: US 10,932,310 B2
(45) Date of Patent: *Feb. 23, 2021

(54) COMMUNICATION DEVICE, COMMUNICATION METHOD, PROGRAM, AND COMMUNICATION SYSTEM

(71) Applicant: Sony Corporation, Tokyo (JP)

(72) Inventors: Daisuke Kawakami, Kanagawa (JP); Hideyuki Suzuki, Tokyo (JP); Katsutoshi Itoh, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/546,882

(22) Filed: Aug. 21, 2019

(65) Prior Publication Data

US 2019/0380162 A1    Dec. 12, 2019

Related U.S. Application Data

(63) Continuation of application No. 15/238,781, filed on Aug. 17, 2016, now Pat. No. 10,455,631, which is a
(Continued)

(30) Foreign Application Priority Data

Mar. 16, 2012    (JP) .............................. JP2012-060673

(51) Int. Cl.
*H04W 76/14*    (2018.01)
*H04W 4/80*    (2018.01)
(Continued)

(52) U.S. Cl.
CPC .............. *H04W 76/14* (2018.02); *H04W 4/80* (2018.02); *H04W 8/005* (2013.01); *H04W 88/06* (2013.01); *H04L 69/14* (2013.01); *H04W 84/12* (2013.01)

(58) Field of Classification Search
CPC ....... H04W 76/14; H04W 4/80; H04W 8/005; H04W 88/06; H04W 84/12; H04W 88/02; H04W 4/00; H04L 69/14
(Continued)

(56) References Cited

U.S. PATENT DOCUMENTS 9,510,392 B2 * 11/2016  Kawakami .............. H04W 4/80
10,455,631 B2 * 10/2019  Kawakami .............. H04W 4/80
(Continued)

FOREIGN PATENT DOCUMENTS

CN    101827434 A    9/2010
CN    101860935 A    10/2010
(Continued)

OTHER PUBLICATIONS

U.S. Appl. No. 14/383,679, filed Sep. 8, 2014, Kawakami et al.
(Continued)

*Primary Examiner* — Inder P Mehra
(74) *Attorney, Agent, or Firm* — William R. McClellan

(57) ABSTRACT

Provided is a communication device including a contactless communication unit that conducts contactless communication, a wireless communication unit that conducts wireless communication, and a control unit that, in a case in which the contactless communication unit detects another communication device, controls activation start of a first communication mode of the wireless communication unit, and controls a connection process for the wireless communication between the contactless communication unit and the other communication device.

15 Claims, 14 Drawing Sheets

Related U.S. Application Data continuation of application No. 14/383,679, filed as application No. PCT/JP2013/052586 on Feb. 5, 2013, now Pat. No. 9,510,392.

(51) Int. Cl.

| | | |
|---|---|---|
| *H04W 8/00* | (2009.01) | |
| *H04W 88/06* | (2009.01) | |
| *H04W 84/12* | (2009.01) | |
| *H04W 4/00* | (2018.01) | |
| *H04W 88/00* | (2009.01) | |
| *H04L 29/06* | (2006.01) | |

(58) Field of Classification Search
USPC .................................................... 455/553.1
See application file for complete search history.

(56) References Cited

U.S. PATENT DOCUMENTS

| | | |
|---|---|---|
| 2009/0221271 A1 | 9/2009 | Soma et al. |
| 2009/0253374 A1 | 10/2009 | Matsuo et al. |
| 2010/0254349 A1 | 10/2010 | Aibara et al. |
| 2010/0316027 A1 | 12/2010 | Rick et al. |
| 2011/0183614 A1* | 7/2011 | Tamura ............... H04M 1/7253 455/41.2 |
| 2011/0225305 A1 | 9/2011 | Vedantham et al. |
| 2011/0275316 A1* | 11/2011 | Suumaki ............. H04W 12/003 455/41.1 |
| 2013/0036231 A1 | 2/2013 | Suumaki |
| 2014/0074719 A1 | 3/2014 | Gressel et al. |
| 2015/0018037 A1 | 1/2015 | Kawakami et al. |
| 2015/0205550 A1 | 7/2015 | Lee et al. |
| 2016/0360566 A1 | 12/2016 | Kawakami et al. |

FOREIGN PATENT DOCUMENTS

| | | |
|---|---|---|
| CN | 102144421 A | 8/2011 |
| JP | 2006-186418 A | 7/2006 |
| JP | 2008-271150 A | 11/2008 |
| JP | 2009-207069 A | 9/2009 |
| JP | 2010-245748 A | 10/2010 |
| JP | 2010-278553 A | 12/2010 |
| JP | 2011-151745 A | 8/2011 |
| JP | 2012-049625 A | 3/2012 |
| JP | 2013-115828 A | 6/2013 |

OTHER PUBLICATIONS

U.S. Appl. No. 15/238,781, filed Aug. 17, 2016, Kawakami et al.
International Search Report and Written Opinion and English translation thereof dated Mar. 12, 2013 in connection with Application No. PCT/JP2013/052586.
International Preliminary Report on Patentability and English translation thereof dated Sep. 25, 2014 in connection with Application No. PCT/JP2013/052586.
Japanese Office Action dated Sep. 29, 2015 in connection with Japanese Application No. 2014-504735.
Japanese Office Action dated Feb. 2, 2016 in connection with Japanese Application No. 2014-504735, with English translation thereof.
Japanese Office Action dated Mar. 17, 2020 in connection with Japanese Application No. 2019-079612, and English translation thereof.
Extended European Search Report dated Nov. 23, 2015 in connection with European Application No. 13760724.8.
Japanese Office Action dated Jul. 4, 2017 in connection with Japanese Application No. 2016-152617 and English translation thereof.
Chinese Office Action dated Jul. 21, 2017 in connection with Chinese Application No. 201380013235.8, and English translation thereof.
Japanese Office Action dated Dec. 25, 2018 in connection with Japanese Application No. 2018-045888, and English translation thereof.
Korean Office Action dated Jan. 9, 2019 in connection with Korean Application No. 10-2014-7023994, and English translation thereof.
Korean Office Action dated Oct. 21, 2019 in connection with Korean Application No. 10-2019-7022694 and English translation thereof.
[No Author Listed], Wi-Fi Protected Setup Specification. Wi-Fi Alliance, Version 1.0h, Dec. 2006, 16 pages.

* cited by examiner

COMMUNICATION DEVICE, COMMUNICATION METHOD, PROGRAM, AND COMMUNICATION SYSTEM

CROSS REFERENCE TO RELATED APPLICATIONS

This application is a continuation of and claims the benefit under 37 U.S.C. § 120 of U.S. patent application Ser. No. 15/238,781, titled "COMMUNICATION DEVICE, COMMUNICATION METHOD, PROGRAM, AND COMMUNICATION SYSTEM," filed Aug. 17, 2016, now U.S. Pat. No. 10,455,631, which is a continuation of and claims the benefit under 37 U.S.C. § 120 of U.S. patent application Ser. No. 14/383,679, titled "COMMUNICATION DEVICE, COMMUNICATION METHOD, PROGRAM, AND COMMUNICATION SYSTEM," filed Sep. 8, 2014, now U.S. Pat. No. 9,510,392, which is the National Stage of International Application No. PCT/JP2013/052586, filed in the Japanese Patent Office as a Receiving Office on Feb. 5, 2013, which claims priority to Japanese Priority Patent Application JP 2012-060673 filed in the Japanese Patent Office on Mar. 16, 2012, each of which is hereby incorporated by reference in its entirety.

TECHNICAL FIELD

The present disclosure relates to a communication device, a communication method, a program, and a communication system.

BACKGROUND ART

Recently, wireless local area network (LAN) systems, as typified by the Institute of Electrical and Electronics Engineers (IEEE) 802.11, are becoming more prevalent instead of wired networks, because of advantages such as a high degree of freedom for equipment. Such wireless LAN systems operate in an infrastructure mode, for example, in which multiple wireless communication devices communicate via an access point.

Meanwhile, Wi-Fi Direct, formulated by the Wi-Fi Alliance, supports a direct communication mode in which multiple wireless communication devices connect directly to form a communication group. In this direct communication mode, communication is initiated after establishing a connection between wireless communication devices using Device Discovery and Formation. Note that Device Discovery is a process for discovering a nearby wireless communication device, while Formation includes processes such as a process of deciding which wireless communication device will operate as a group owner, and an authentication process (Provisioning).

There also exists a wireless communication device capable of switching between the infrastructure mode and the direct communication mode discussed above to communicate. Additionally, contactless communication over a shorter communication range than wireless communication such as wireless LAN is also becoming widespread. For example, Patent Literature 1 discloses a communication device equipped with a contactless communication unit that conducts contactless communication, and a wireless communication unit that conducts wireless communication.

CITATION LIST

Patent Literature

Patent Literature 1: JP 2008-271150A

SUMMARY OF INVENTION

Technical Problem

However, a wireless communication device that has not activated direct communication mode starts a connection process for connecting with another wireless communication device after completing the activation of direct communication mode. For this reason, there is a tendency of a lengthier time until a wireless communication device that has not activated direct communication mode establishes a connection in direct communication mode with another wireless communication device.

Accordingly, the present disclosure proposes a new and improved communication device, communication method, program, and communication system able to shorten the wait time until connection establishment.

Solution to Problem

According to the present disclosure, there is provided a communication device including a contactless communication unit that conducts contactless communication, a wireless communication unit that conducts wireless communication, and a control unit that, in a case in which the contactless communication unit detects another communication device, controls activation start of a first communication mode of the wireless communication unit, and controls a connection process for the wireless communication between the contactless communication unit and the other communication device.

According to the present disclosure, there is provided a communication method including detecting another communication device by contactless communication, starting activation of a first communication mode of wireless communication, and conducting a connection process for the wireless communication with the other communication device by the contactless communication.

According to the present disclosure, there is provided a program for causing a computer to function as a contactless communication unit that conducts contactless communication, a wireless communication unit that conducts wireless communication, and a control unit that, in a case in which the contactless communication unit detects another communication device, controls activation start of a first communication mode of the wireless communication unit, and controls a connection process for the wireless communication between the contactless communication unit and the other communication device.

According to the present disclosure, there is provided a communication system including a plurality of communication devices. Each of the plurality of communication devices includes a contactless communication unit that conducts contactless communication, a wireless communication unit that conducts wireless communication, and a control unit that, in a case in which the contactless communication unit detects another communication device, controls activation start of a first communication mode of the wireless communication unit, and controls a connection process for the wireless communication between the contactless communication unit and the other communication device.

Advantageous Effects of Invention

According to the present disclosure as described above, the wait time until connection establishment may be shortened.

DESCRIPTION OF EMBODIMENTS

Figure 1:
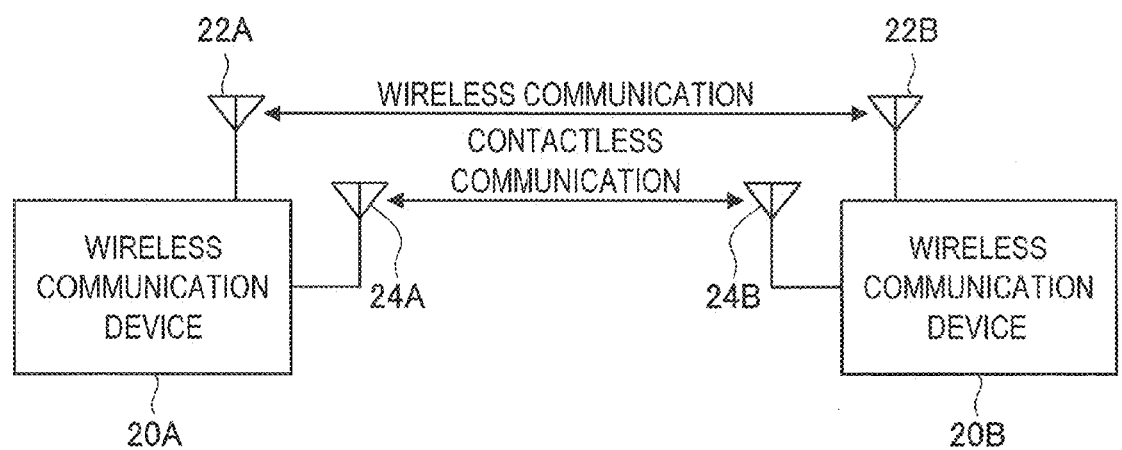
FIG. 1 is an explanatory diagram illustrating a configuration of a wireless communication system according to the first embodiment of the present disclosure.

Hereinafter, preferred embodiments of the present invention will be described in detail with reference to the appended drawings. Note that, in this specification and the drawings, elements that have substantially the same function and structure are denoted with the same reference signs, and repeated explanation is omitted.

Also, in this specification and the appended drawings, multiple structural elements having substantially the same function and structure may in some cases be distinguished by different letters appended to the same sign. For example, multiple elements having substantially the same function and structure are distinguished as wireless communication devices 20A, 20B, and so on as necessary. On the other hand, when not particularly distinguishing each of multiple structural elements having substantially the same function and structure, only the same sign will be given. For example, the wireless communication devices 20A and 20B will be simply designated the wireless communication device 20 when not being particularly distinguished.

In addition, the present disclosure will be described in the order indicated below.
1. First Embodiment
1-1. Configuration of wireless communication system
1-2. Configuration of wireless communication device
1-3. Operation of wireless communication system
1-4. Operation of wireless communication device
1-5. Exemplary modifications
2. Second Embodiment
3. Hardware configuration
4. Conclusion

1. FIRST EMBODIMENT

A wireless communication device 20 according to the first embodiment of the present disclosure is a communication device equipped with:

A. a contactless communication unit (NFC antenna 24, NFC interface 240) that conducts contactless communication;

B. a wireless communication unit (wireless antenna 22, wireless LAN interface 220) that conducts wireless communication; and C. a control unit (280) that, in a case in which the contactless communication unit detects another communication device, starts activation of a first communication mode of the wireless communication unit, and controls a connection process for the wireless communication between the contactless communication unit and the other communication device.

Hereinafter, first, a basic configuration of a wireless communication system that includes such a wireless communication device 20 will be described.

1-1. Configuration of Wireless Communication System

FIG. 1 is an explanatory diagram illustrating a configuration of a wireless communication system according to the first embodiment of the present disclosure. As illustrated in FIG. 1, a wireless communication system according to the first embodiment of the present disclosure is equipped with multiple wireless communication devices 20.

The wireless communication device 20 includes a wireless communication function using wireless LAN, and uses a wireless antenna 22 to conduct wireless communication with a nearby wireless communication device 20. Additionally, the wireless communication device 20 operates in infrastructure mode (a second communication mode), or direct communication mode (a first communication mode). In the case of operating in infrastructure mode, the wireless communication device 20 communicates with another wireless communication device via an access point. On the other hand, in the case of operating in direct communication mode, the wireless communication device 20 directly communicates with a nearby wireless communication device 20, without traversing an access point.

Note that the direct communication mode may be Wi-Fi Direct, formulated by the Wi-Fi Alliance. In this direct communication mode, communication is initiated after establishing a connection between wireless communication devices using Device Discovery and Formation. Note that Device Discovery is a process for discovering a nearby wireless communication device, while Formation includes processes such as a process of deciding which wireless communication device will operate as a group owner, and an authentication process (Provisioning).

In addition, the wireless communication device 20 includes a near field communication (NFC) function, and uses an NFC antenna 24 to conduct NFC communication (contactless communication) with a nearby wireless communication device 20.

Note that the wireless communication device 20 may also be an information processing device such as a personal computer (PC), a home game console, an electrical appliance, a mobile phone, a Personal Handy-phone System (PHS), a portable music player, or a portable video processing device.

In addition, the wireless communication device 20 may communicate audio data such as music, lectures, and radio programs, video data such as movies, video programs, photographs, documents, drawings, and charts, and content data such as games and software.

Background

Meanwhile, a typical wireless communication device, after completing the activation of direct communication mode, starts a connection process for communicating with another wireless communication device by direct communication mode. Note that the connection process may be Device Discovery and Formation. For this reason, there is a tendency of a lengthier time until a wireless communication device that has not activated direct communication mode establishes a connection in direct communication mode with another wireless communication device. This point will be described more specifically below with reference to FIG. 2.

Figure 2:
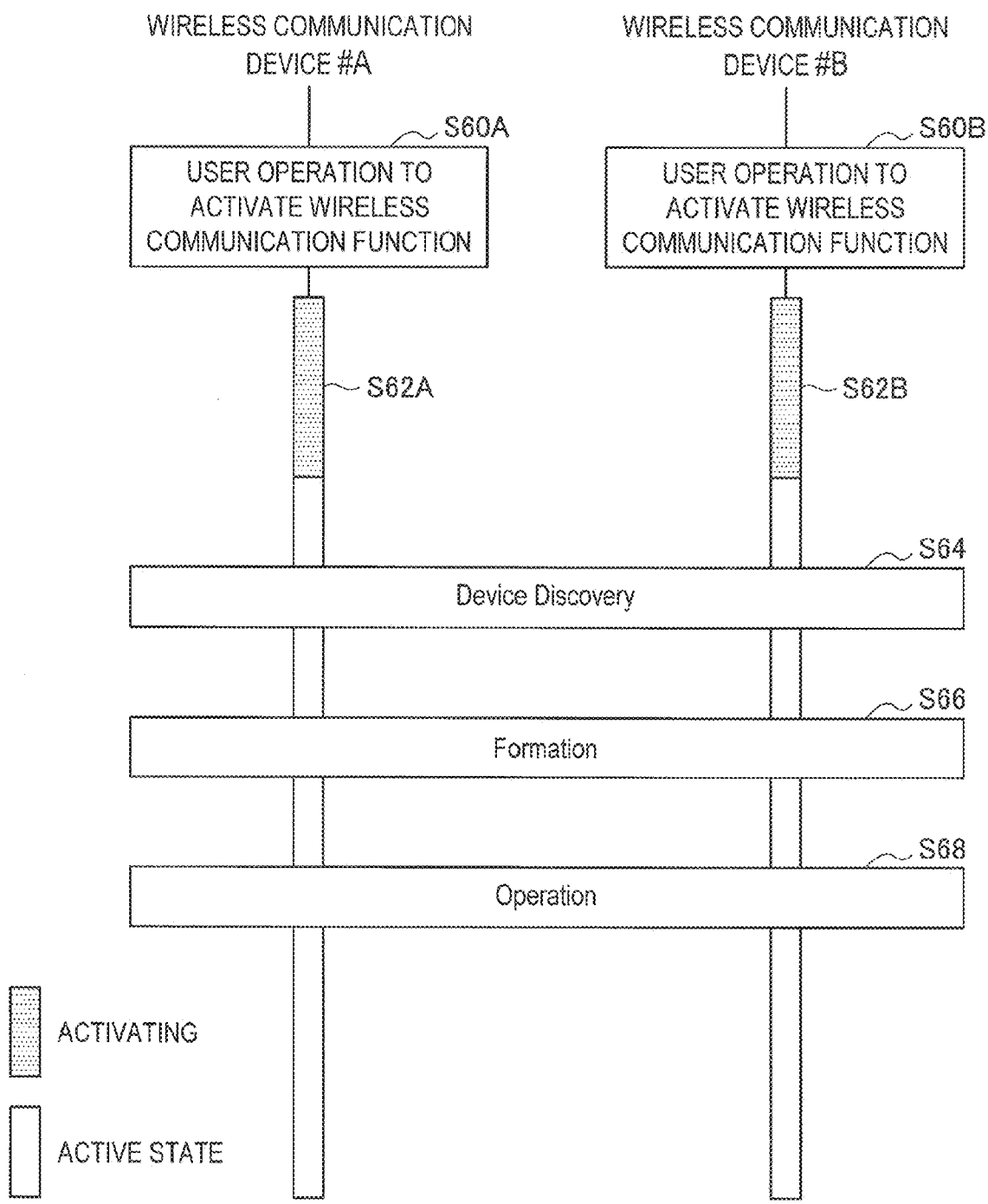
FIG. 2 is an explanatory diagram illustrating operation of a wireless communication system according to a comparative example.

FIG. 2 is an explanatory diagram illustrating operation of a wireless communication system according to a comparative example. As illustrated in FIG. 2, in a wireless communication system according to a comparative example, a user performs an operation to activate the direct communication mode of a wireless communication device #A, and an operation to activate the direct communication of a wireless communication device #B (S60A, S60B). Consequently, the wireless communication device #A and the wireless communication device #B conduct a direct communication mode activation process (S62A, S62B).

Subsequently, after activation of the wireless communication device #A and the wireless communication device #B is completed and the wireless communication device #A and the wireless communication device #B enter an active state, the wireless communication device #A and the wireless communication device #B discover each other by Device Discovery (S64).

Then, the wireless communication device #A and the wireless communication device #B decide a parent/child relationship and conduct an authentication process by Formation (S66), and start direct communication (Operation) (S68).

In this way, in the wireless communication system according to the comparative example, the connection process is initiated after completing the activation of direct communication in the wireless communication devices. For this reason, there is a long time until a connection is established and direct communication becomes executable.

Accordingly, focusing on the above circumstances led to the creation of the first embodiment of the present disclosure. According to the first embodiment of the present disclosure, it is possible to shorten the wait time until connection establishment. Hereinafter, such a first embodiment of the present disclosure will be described in detail.

1-2. Configuration of Wireless Communication Device

Figure 3:
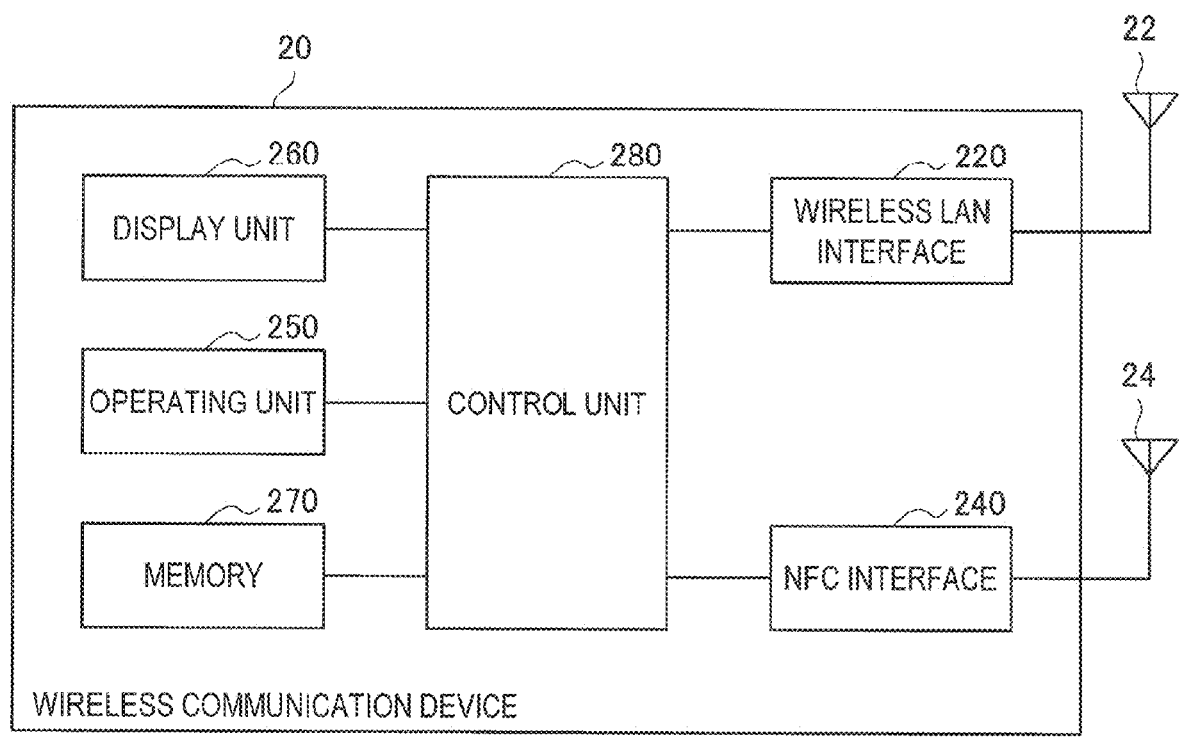
FIG. 3 is a function block diagram illustrating a configuration of a wireless communication device 20 according to the first embodiment.

FIG. 3 is a function block diagram illustrating a configuration of a wireless communication device 20 according to the first embodiment. As illustrated in FIG. 3, a wireless communication device 20 according to the first embodiment is equipped with a wireless antenna 22, an NFC antenna 24, a wireless LAN interface 220, an NFC interface 240, an operating unit 250, a display unit 260, memory 270, and a control unit 280.

The wireless LAN interface 220, under control by the control unit 280, conducts a connection process for connecting with a nearby wireless communication device 20, directly communicating with a nearby wireless communication device 20, and the like, by working cooperatively with the wireless antenna 22. For example, the wireless LAN interface 220 performs signal receiving processes such as down-conversion, demodulation, and decoding on a wireless signal received by the wireless antenna 22, and supplies received data obtained by the signal receiving processes to the control unit 280. Additionally, the wireless LAN interface 220 performs signal transmitting processes such as encoding, modulation, and up-conversion on transmit data supplied from the control unit 280, and outputs a high-frequency signal obtained by the signal transmitting processes to the wireless antenna.

The NFC interface 240, under control by the control unit 280, conducts NFC communication with a nearby wireless communication device 20 by working cooperatively with the NFC antenna 24. For example, the NFC interface 240 may transmit a radio wave that reaches a short distance of approximately 10 cm from the NFC antenna 24, drive the NFC antenna 24 of another wireless communication device 20 included within the radio wave range, and communicate with the other wireless communication device 20.

The operating unit 250 is a component by which a user performs operations to give instructions to the wireless communication device 20 and input information. The operating unit 250, upon detecting a user operation, outputs a signal according to the detected user operation to the control unit 280. Such an operating unit 250 may be a mouse, a keyboard, a touch panel, a button, a microphone, a switch, or a lever, for example.

The display unit 260, under control by the control unit 280, displays various display screens. For example, the display unit 260 displays screens that notify a user of connection start and connection completion with another wireless communication device 20. Such a display unit 260 may be a cathode ray tube (CRT) display device, a liquid crystal display (LCD) device, an organic light-emitting diode (OLED) device, or an LED lamp, for example.

The memory 270 stores programs required by the wireless communication device 20 to operate, information for connecting to another wireless communication device 20, and the like. For example, the memory 270 stores credentials for another wireless communication device 20 (such as an SSID and WPA2-PSK), configuration information, or the like.

The control unit 280 controls overall operation of the wireless communication device 20. For example, the control unit 280 controls the activation of the direct communication mode of the wireless LAN interface 220, Device Discovery and Formation by the wireless LAN interface 220, and the like.

Note that Device Discovery is a process by which multiple wireless communication devices 20 discover each other. In this Device Discovery, a beacon, a probe request, and a probe response are transmitted in order to scan, wait for a response, and search. Also, in Formation, the assignment of roles (such as group owner or client) is decided and an authentication process (Provision) is conducted with another discovered wireless communication device 20.

Also, if another wireless communication device 20 is detected by the NFC interface 240, the control unit 280 according to the present embodiment starts activation of the direct communication mode of the wireless LAN interface 220, and in addition, causes the NFC interface 240 to start a connection process for direct communication with the other wireless communication device 20. According to such a configuration, a connection process for direct communication may be conducted in parallel with the activation of direct communication mode, and thus the wait time until connection establishment may be shortened. Hereinafter, this point will be described in further detail with reference to specific operation.

1-3. Operation of Wireless Communication System (Overall Operation of System)

Figure 4:
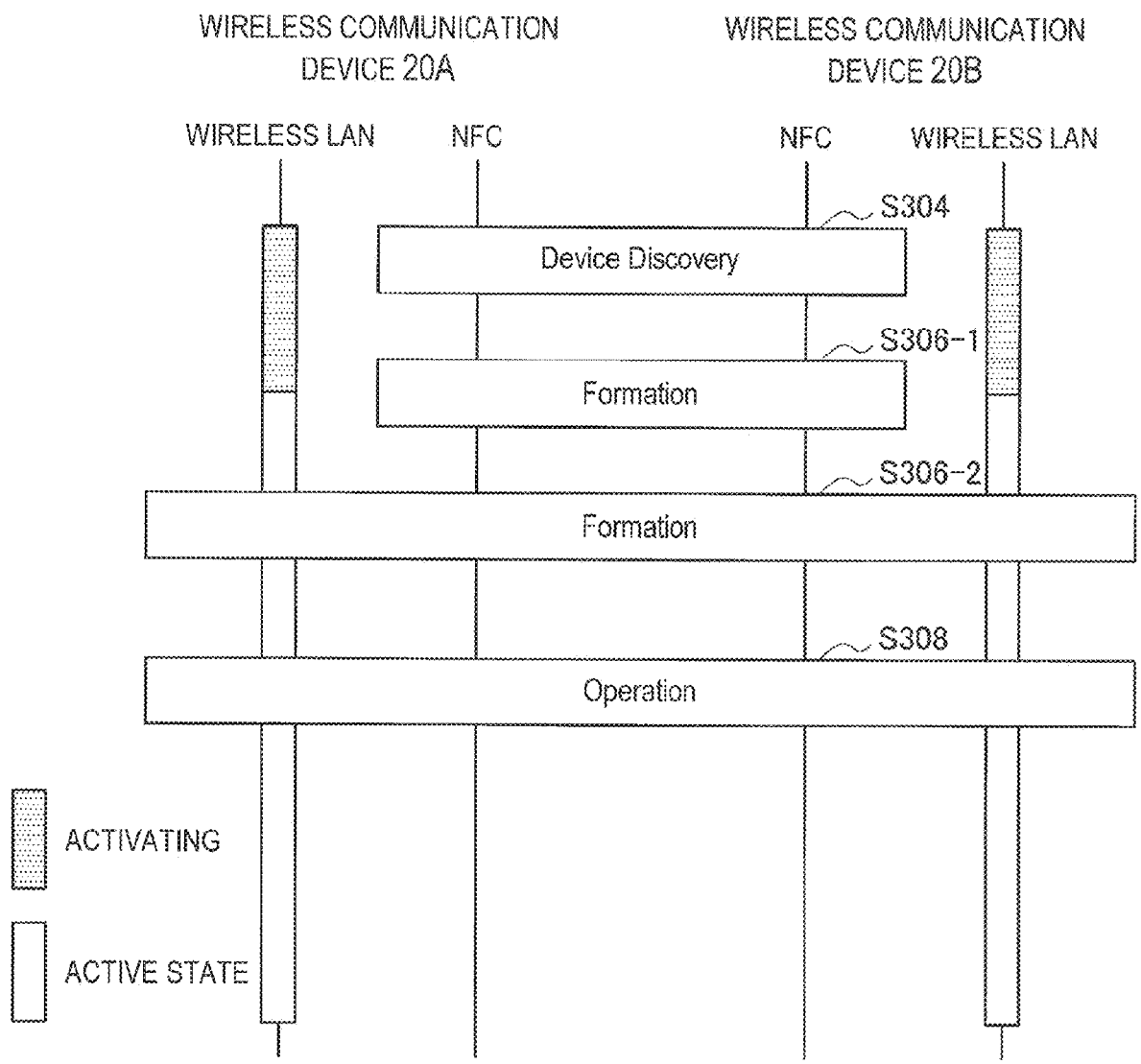
FIG. 4 is an explanatory diagram illustrating operation of a wireless communication system according to the first embodiment.

FIG. 4 is an explanatory diagram illustrating operation of a wireless communication system according to the first embodiment. As illustrated in FIG. 4, a wireless communication device 20A, upon detecting a wireless communication device 20B by Device Discovery using NFC communication while direct communication mode is off (S304), causes the wireless LAN interface 220 to activate direct communication mode. Similarly, the wireless communication device 20B, upon detecting the wireless communication device 20A, causes the wireless LAN interface 220 to activate direct communication mode.

Note that the wireless communication device 20A may also cause direct communication mode to be activated in the case of receiving information requesting direct communication during NFC communication with the wireless communication device 20B. Also, Device Discovery is primarily conducted in order to discover a specific wireless communication device from among multiple wireless communication devices. For this reason, the wireless communication device 20 may also omit Device Discovery if a peer wireless communication device may be specified by a proximity operation like NFC communication.

Figure 5:
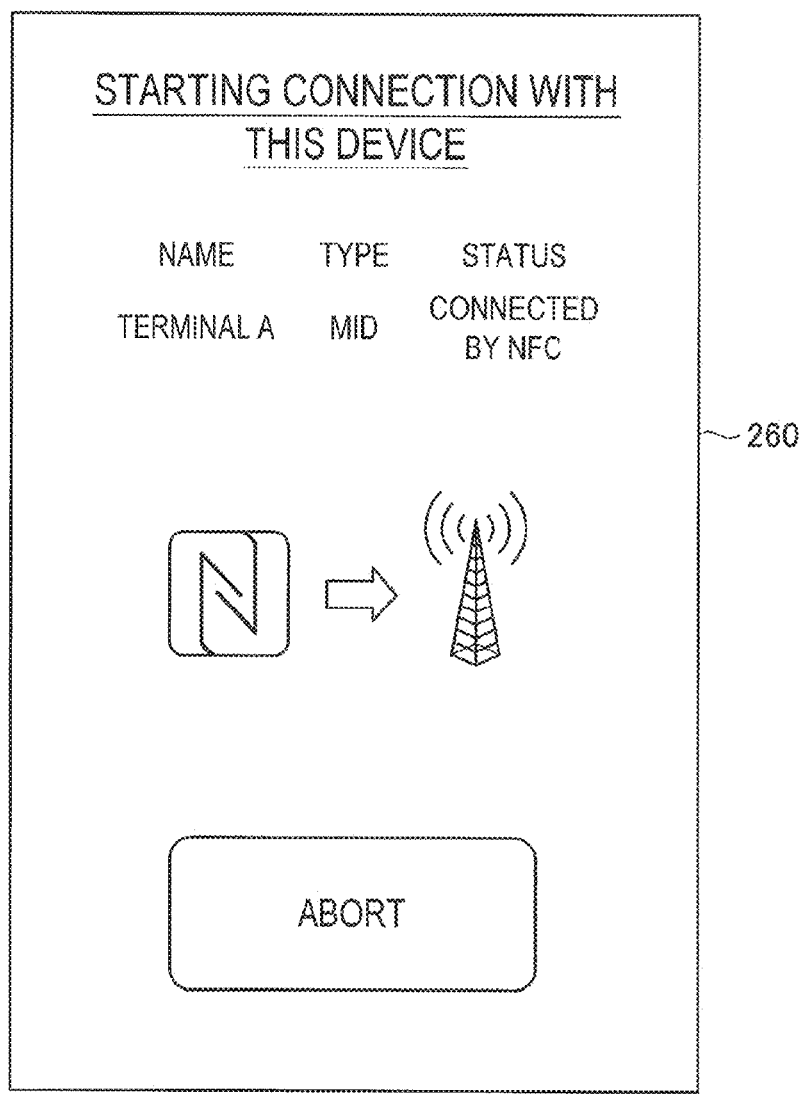
FIG. 5 is an explanatory diagram illustrating a specific example of a connection start screen.

After that, the wireless communication device 20A and the wireless communication device 20B start Formation in parallel with the activation of direct communication mode (S306-1). At this point, the display unit 260 of the wireless communication device 20 may display a screen indicating connection start, as illustrated in FIG. 5. A user, by selecting the "Abort" button on this screen, is able to give an instruction to abort the connection process between the wireless communication device 20A and the wireless communication device 20B.

Note that since the communication speed of NFC is poorer than wireless communication such as LAN, the wireless communication device 20 may attempt to shorten the communication time by reducing the size of packets communicated by NFC. For example, in Formation, information such as a Device_Name (maximum 32 bytes) and a P2P_Group_ID (maximum 32 bytes) are communicated as P2P_Device_info. For this reason, the wireless communication device 20 may use shortened names for the Device_Name and the P2P_Group_ID, and may not communicate optional attributes. According to such a configuration, the packet size may be reduced, and the communication time may be shortened.

Figure 6:
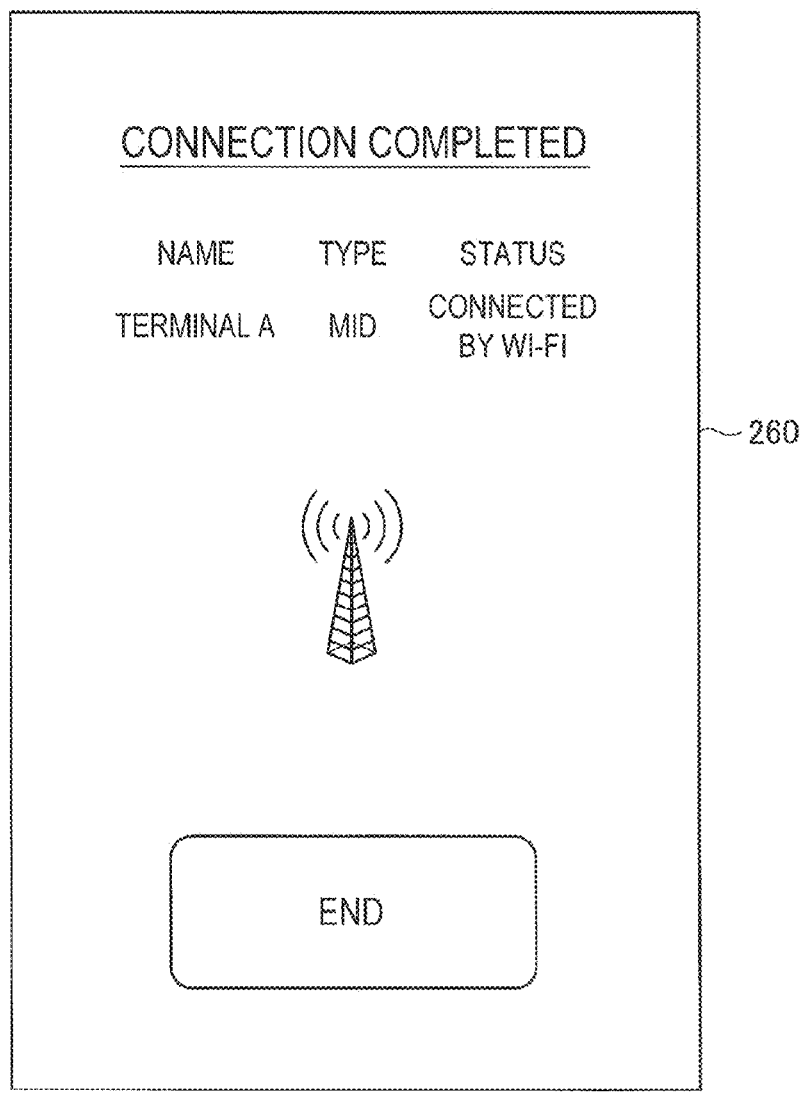
FIG. 6 is an explanatory diagram illustrating a specific example of a connection completion screen.

Subsequently, after the activation of direct communication mode is completed, the wireless communication device 20A and the wireless communication device 20B uses wireless communication to conduct an unexecuted process in Formation (S306-2). Consequently, a connection between the wireless communication device 20A and the wireless communication device 20B is established (S308). At this point, the display unit 260 of the wireless communication device 20 may display a screen indicating connection completion, as illustrated in FIG. 6. Note that after the activation of direct communication mode is completed, the wireless communication device 20 starts transmission of a wireless signal such as a beacon.

As discussed earlier, after the activation of direct communication mode is completed, the wireless communication device 20 conducts an unexecuted process of the connection process by wireless communication. For this reason, the connection process to conduct by wireless communication changes according to the timing when the activation of direct communication mode is completed. Hereinafter, a specific example will be described.

First Execution Example of Formation

Figure 7:
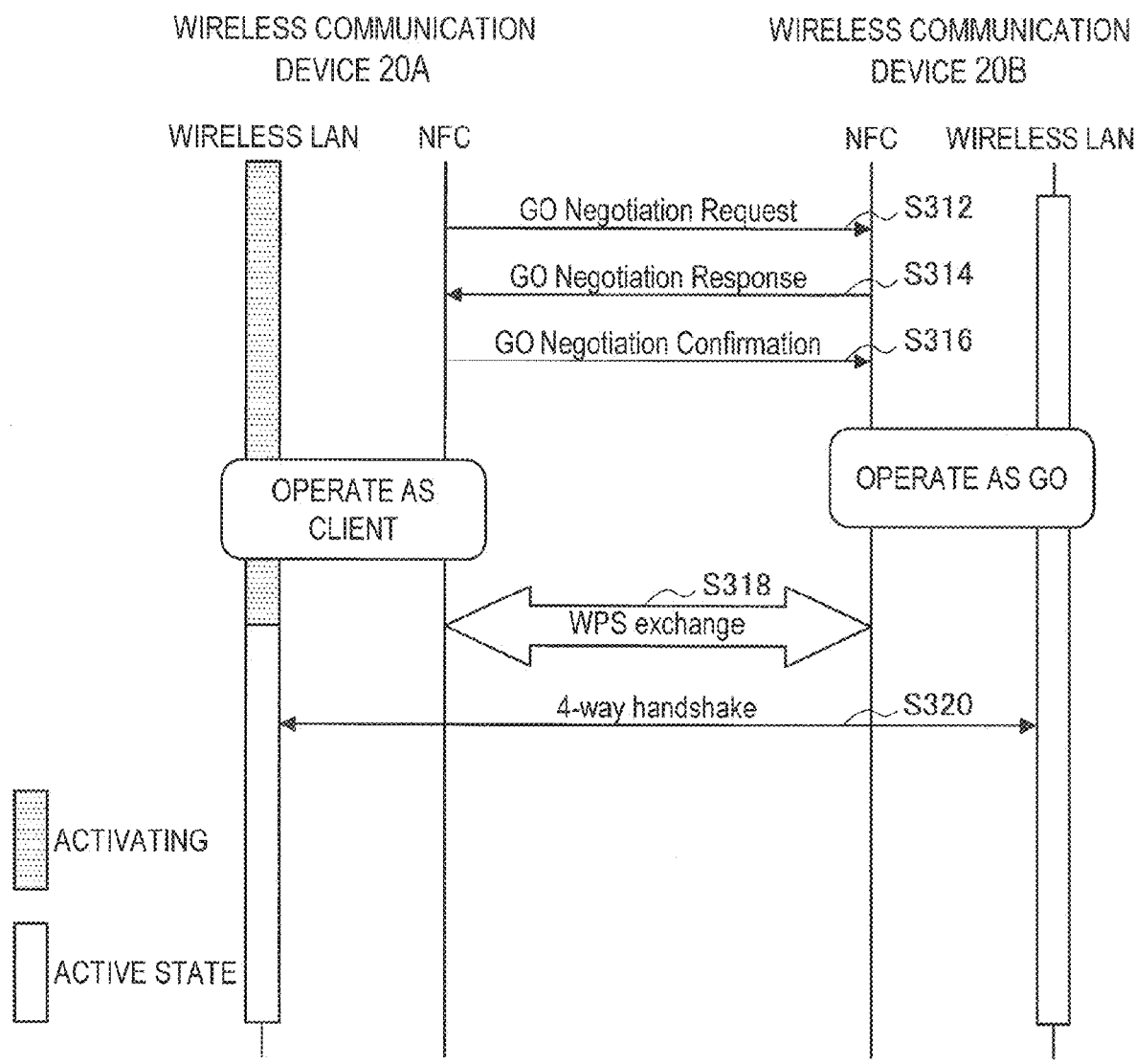
FIG. 7 is an explanatory diagram illustrating a first execution example of Formation.

FIG. 7 is an explanatory diagram illustrating a first execution example of Formation. As illustrated in FIG. 7, if the direct communication mode of the wireless communication device 20A is active, GO_Negotiation is conducted by having the wireless communication device 20A transmit a GO_Negotiation_Request by NFC (S312), the wireless communication device 20B transmit a GO_Negotiation_Response by NFC (S314), and the wireless communication device 20A transmit a GO_Negotiation_Confirmation by NFC (S316).

Note that in GO_Negotiation, each of the wireless communication device 20A and the wireless communication device 20B exchanges a priority for operating as group owner, and the wireless communication device 20 with a higher priority decides to operate as group owner. FIG. 7 illustrates an example in which, according to this GO_Negotiation, it is decided that the wireless communication device 20B will operate as the group owner, and the wireless communication device 20A will operate as a client.

After that, the wireless communication device 20A and the wireless communication device 20B execute WPS_exchange by NFC, and share credentials (such as an SSID and WPA2-PSK) (S318).

Subsequently, the wireless communication device 20A and the wireless communication device 20B execute a 4-way_handshake. At this point, in the example illustrated in FIG. 7, the activation of the direct communication mode of the wireless communication device 20A has been completed, and thus the wireless communication device 20A and the wireless communication device 20B execute a 4-way_handshake by wireless communication (S320).

In this way, in the first execution example, the GO_Negotiation and WPS_exchange are executed by NFC, while the 4-way_handshake is executed by wireless communication.

Second Execution Example of Formation

Figure 8:
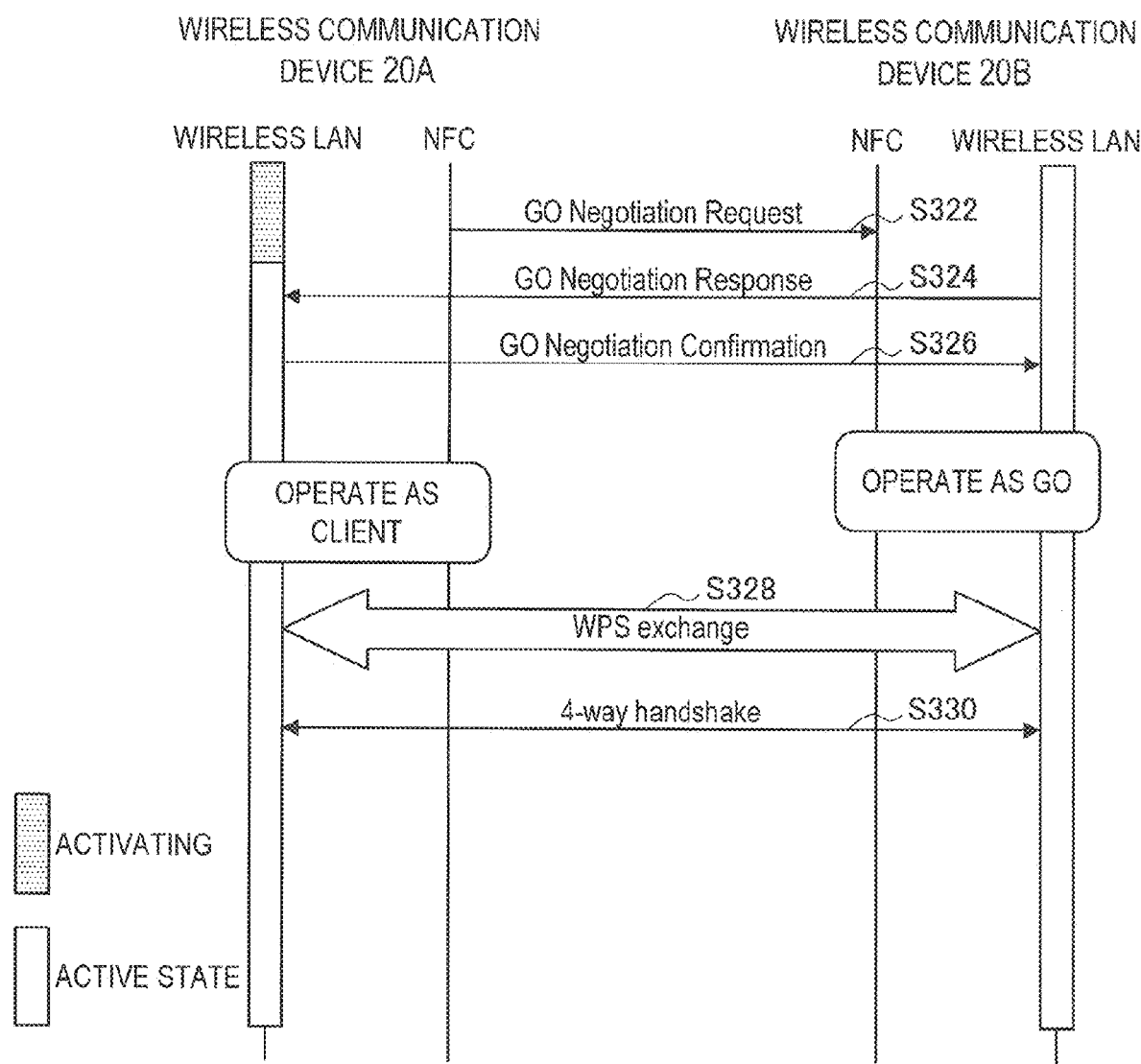
FIG. 8 is an explanatory diagram illustrating a second execution example of Formation.

FIG. 8 is an explanatory diagram illustrating a second execution example of Formation. As illustrated in FIG. 8, if the direct communication mode of the wireless communication device 20A is active, the wireless communication device 20A transmits a GO_Negotiation_Request by NFC (S322). Subsequently, the wireless communication device 20B transmits a GO_Negotiation_Response. At this point, in the example illustrated in FIG. 8, the activation of the direct communication mode of the wireless communication device 20A has been completed, and thus the wireless communication device 20B transmits the GO_Negotiation_Response by wireless communication (S324). Note that the wireless communication device 20B is able to determine whether or not the activation of the direct communication mode of the wireless communication device 20A has been completed based on whether or not the wireless communication device 20A has started transmission of a wireless signal such as a beacon.

Subsequently, the wireless communication device 20A transmits a GO_Negotiation_Confirmation by wireless communication (S326).

Furthermore, the wireless communication device 20A and the wireless communication device 20B conduct the subsequent WPS_exchange and 4-way_handshake by wireless communication (S328, S330).

In this way, in the second execution example, unlike the first execution example, part of GO_Negotiation is executed by NFC, while the remaining processes of GO_Negotiation, WPS_exchange, and 4-way_handshake are conducted by wireless communication.

(Supplemental Remarks)

Note that the present embodiment is also applicable to WPS_Push_Button_Configuration. Hereinafter, such a case will be more specifically described with reference to FIG. 9.

Figure 9:
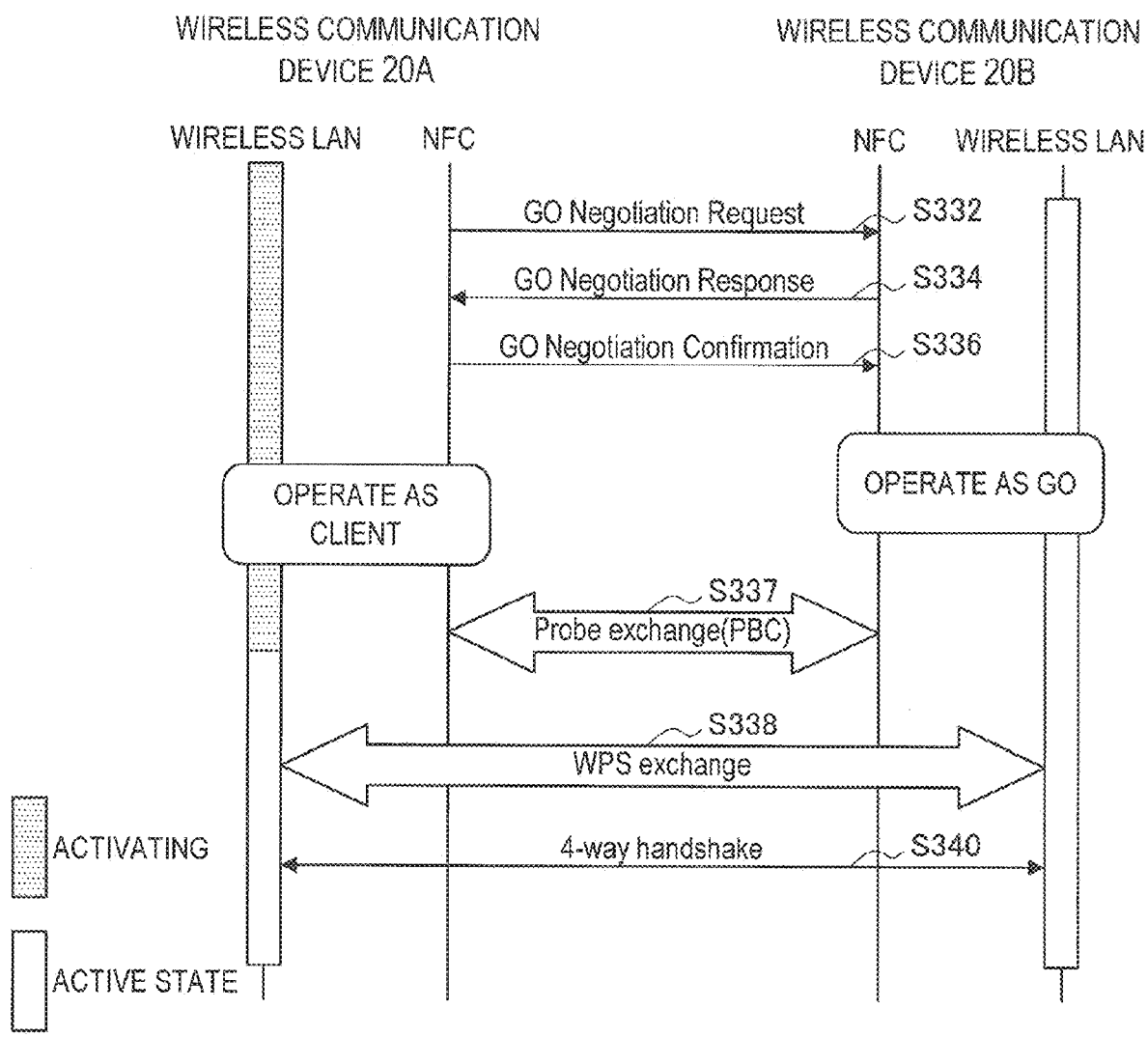
FIG. 9 is an explanatory diagram illustrating another execution example of the present embodiment.

FIG. 9 is an explanatory diagram illustrating another execution example of the present embodiment. As illustrated in FIG. 9, if the direct communication mode of the wireless communication device 20A is active, GO_Negotiation is conducted by having the wireless communication device 20A transmit a GO_Negotiation_Request by NFC (S332), the wireless communication device 20B transmit a GO_Negotiation_Response by NFC (S334), and the wireless communication device 20A transmit a GO_Negotiation_Confirmation by NFC (S336).

After that, the wireless communication device 20A and the wireless communication device 20B execute a Probe_exchange (PBC) by NFC (S337). Subsequently, the wireless communication device 20A and the wireless communication device 20B conduct the WPS_exchange and the 4-way_handshake. At this point, in the example illustrated in FIG. 9, the activation of the direct communication mode of the wireless communication device 20A has been completed, and thus the wireless communication device 20A and the wireless communication device 20B conduct the WPS_exchange and the 4-way_handshake by wireless communication (S338, S340). Consequently, a connection between the wireless communication device 20A and the wireless communication device 20B is established.

1-4. Operation of Wireless Communication Device

The above thus describes operation of a wireless communication system according to the first embodiment. Next, operation of a wireless communication device 20 according to the first embodiment will be summarized with reference to FIG. 10.

Figure 10:
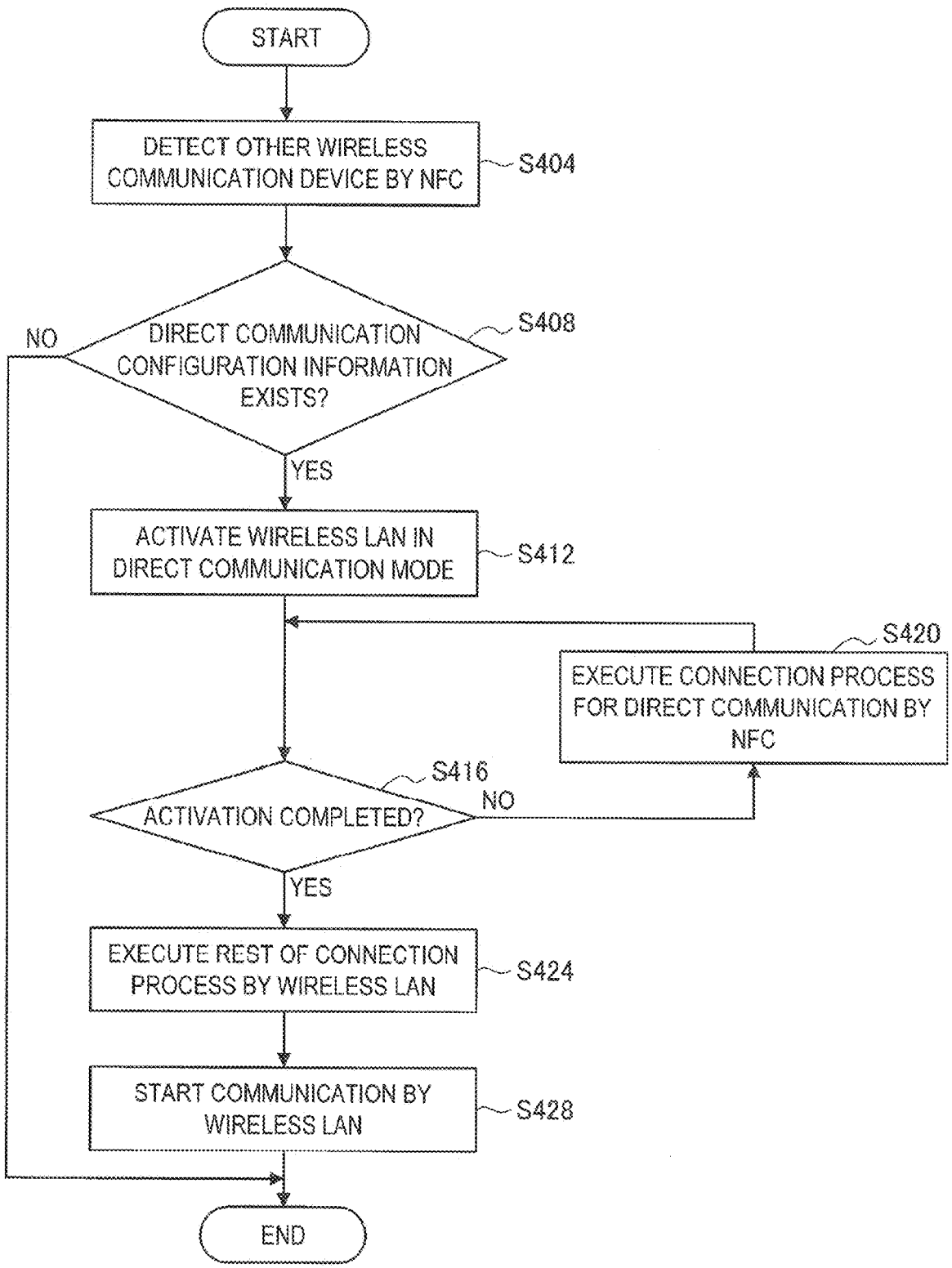
FIG. 10 is a flowchart illustrating operation of a wireless communication device 20 according to the first embodiment.

FIG. 10 is a flowchart illustrating operation of a wireless communication device 20 according to the first embodiment. As illustrated in FIG. 10, upon detecting another wireless communication device by NFC (S404), the control unit 280 of the wireless communication device 20 judges whether or not direct communication configuration information is included in information communicated with the other wireless communication device (S408). At this point, if direct communication configuration information is not included, the wireless communication device 20 does not conduct the processes of S412 to S428 described below.

On the other hand, if direct communication configuration information is included, the control unit 280 causes the wireless LAN interface 220 to activate direct communication mode (S412). Subsequently, the NFC interface 240 executes a connection process for direct communication by NFC until the activation of the direct communication mode is completed (S416, S420).

After that, when the activation of direct communication mode is completed, the control unit 280 causes the wireless LAN interface 220 to execute the rest of the connection process (S424). Subsequently, after the entire connection process is completed, the wireless communication device 20 starts communication with the other wireless communication device by wireless LAN (S428).

As described above, if another wireless communication device 20 is detected by the NFC interface 240, the control unit 280 according to the present embodiment controls activation start of the direct communication mode of the wireless LAN interface 220, and in addition, causes the NFC interface 240 to start a connection process for direct communication with the other wireless communication device 20. According to such a configuration, a connection process for direct communication may be conducted in parallel with the activation of direct communication mode, and thus the wait time until connection establishment may be shortened.

1-5. Exemplary Modifications

Note that although the foregoing describes the wireless communication device 20 conducting a process in the case in which direct communication is off. However, the case in which direct communication mode is off encompasses both the case in which the wireless LAN interface 220 is off, as well as the case in which the wireless LAN interface 220 is operating in infrastructure mode.

Typically, in the case in which a wireless communication device (hereinafter, the first wireless communication device) is operating in infrastructure mode, in order for a second wireless communication device to connect to the first wireless communication device in direct communication mode, a user performs an operation of disconnecting the first wireless communication device from an access point, and conducting an operation of connecting the first wireless communication device and the second wireless communication device.

However, these disconnecting and connecting operations are burdensome to the user. In contrast, according to an exemplary modification of the present embodiment, it is possible to easily switch from infrastructure mode to direct communication. Hereinafter, such an exemplary modification of the present embodiment will be described with reference to FIG. 11.

Figure 11:
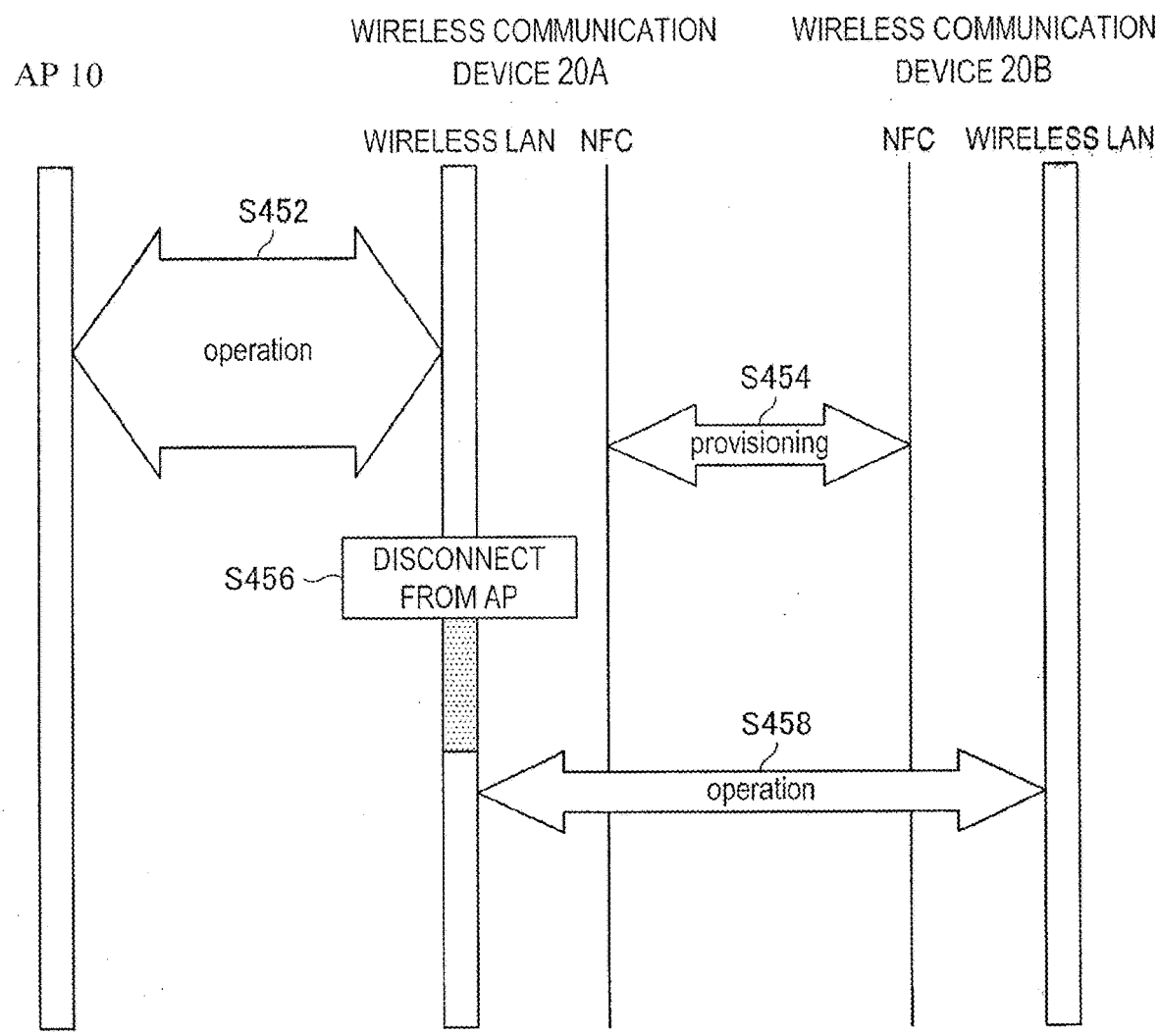
FIG. 11 is an explanatory diagram illustrating an exemplary modification of the first embodiment.

FIG. 11 is an explanatory diagram illustrating an exemplary modification of the first embodiment. As illustrated in FIG. 11, consider the case in which a wireless communication device 20A and a wireless communication device 20B are brought close together while an AP 10 and the wireless communication device 20A are connected in infrastructure mode (S452). In this case, the wireless communication device 20A detects the wireless communication device 20B by NFC, and conducts Provisioning by NFC, for example (S454).

Meanwhile, if the wireless communication device 20B is detected by NFC, the wireless communication device 20A disconnects the connection with the AP 10, and starts activation of direct communication mode (S456). Subsequently, after the activation of direct communication mode is completed, the wireless communication device 20A and the wireless communication device 20B are connected (S458).

In this way, according to an exemplary modification of the first embodiment, it becomes possible to easily switch the communication mode from infrastructure mode to direct communication mode without operating the wireless communication device 20A.

2. SECOND EMBODIMENT

The foregoing thus describes the first embodiment of the present disclosure. Next, a second embodiment of the present disclosure will be described. According to the second embodiment of the present disclosure, it is possible to shorten the time to connect three or more wireless communication devices. Hereinafter, after describing a typical connection procedure for three or more wireless communication devices, the present embodiment will be specifically described.

Figure 12:
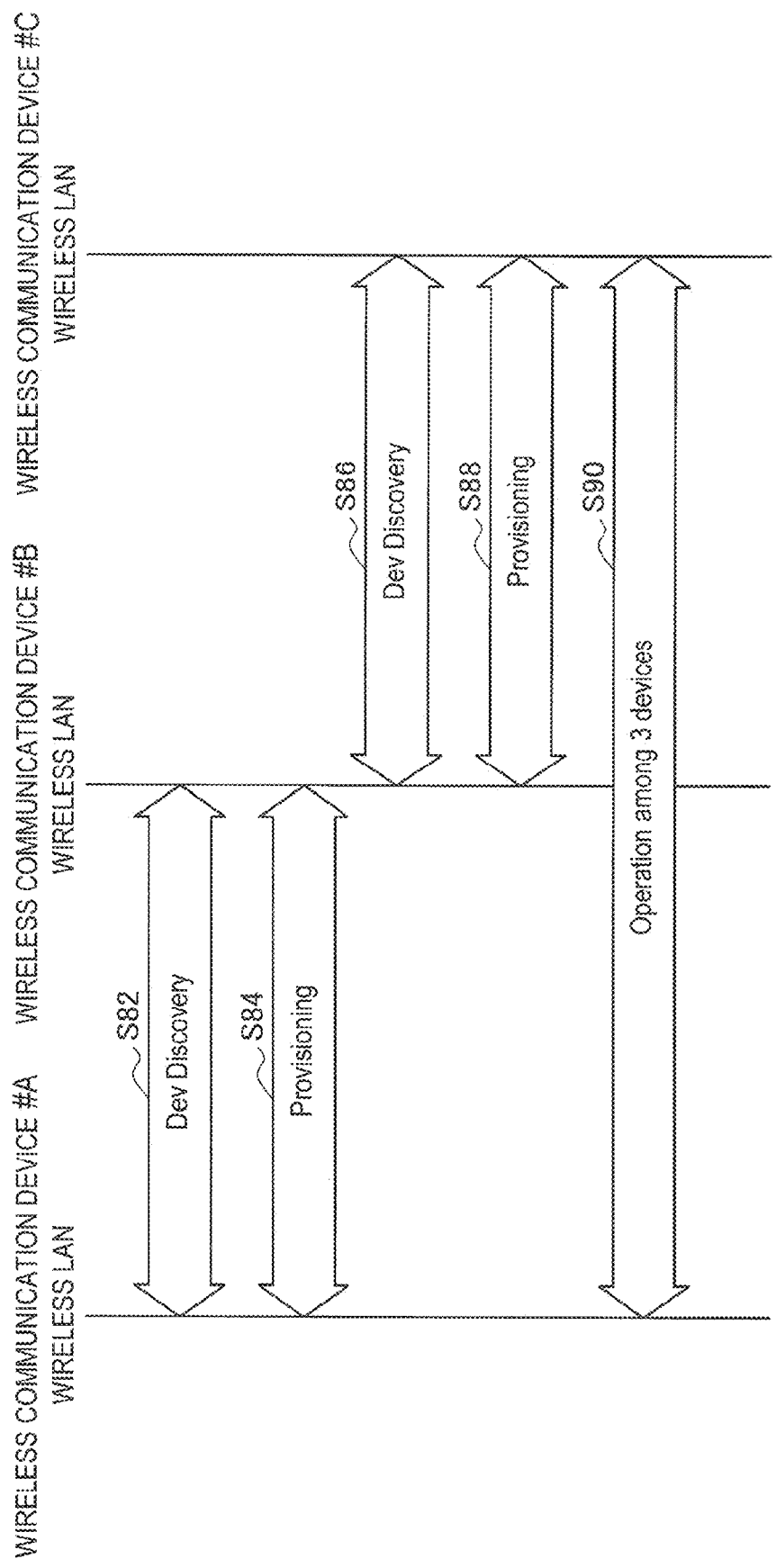
FIG. 12 is an explanatory diagram illustrating a typical connection procedure for three or more wireless communication devices.

FIG. 12 is an explanatory diagram illustrating a typical connection procedure for three or more wireless communication devices. As illustrated in FIG. 12, in order to connect a wireless communication device #A, a wireless communication device #B, and a wireless communication device #C, first, the wireless communication device #A and the wireless communication device #B conducts Device Discovery and Provisioning (S82, S84). Consequently, a communication group of the wireless communication device #A and the wireless communication device #B is formed.

Subsequently, by having the wireless communication device #B and the wireless communication device #C conduct Device Discovery and Provisioning, the wireless communication device #C joins the communication group (S86, S88). As a result, wireless communication becomes possible among the wireless communication device #A, the wireless communication device #B, and the wireless communication device #C.

However, with the connection procedure illustrated in FIG. 12, the connection process between the wireless communication device #A and the wireless communication device #B as well as the connection process between the wireless communication device #B and the wireless communication device #C are conducted serially. In contrast, in the second embodiment of the present disclosure, connection processes for multiple pairs of wireless communication devices are conducted in parallel, thereby enabling a shortening of the connection time. The description hereinafter will refer to FIG. 13.

Figure 13:
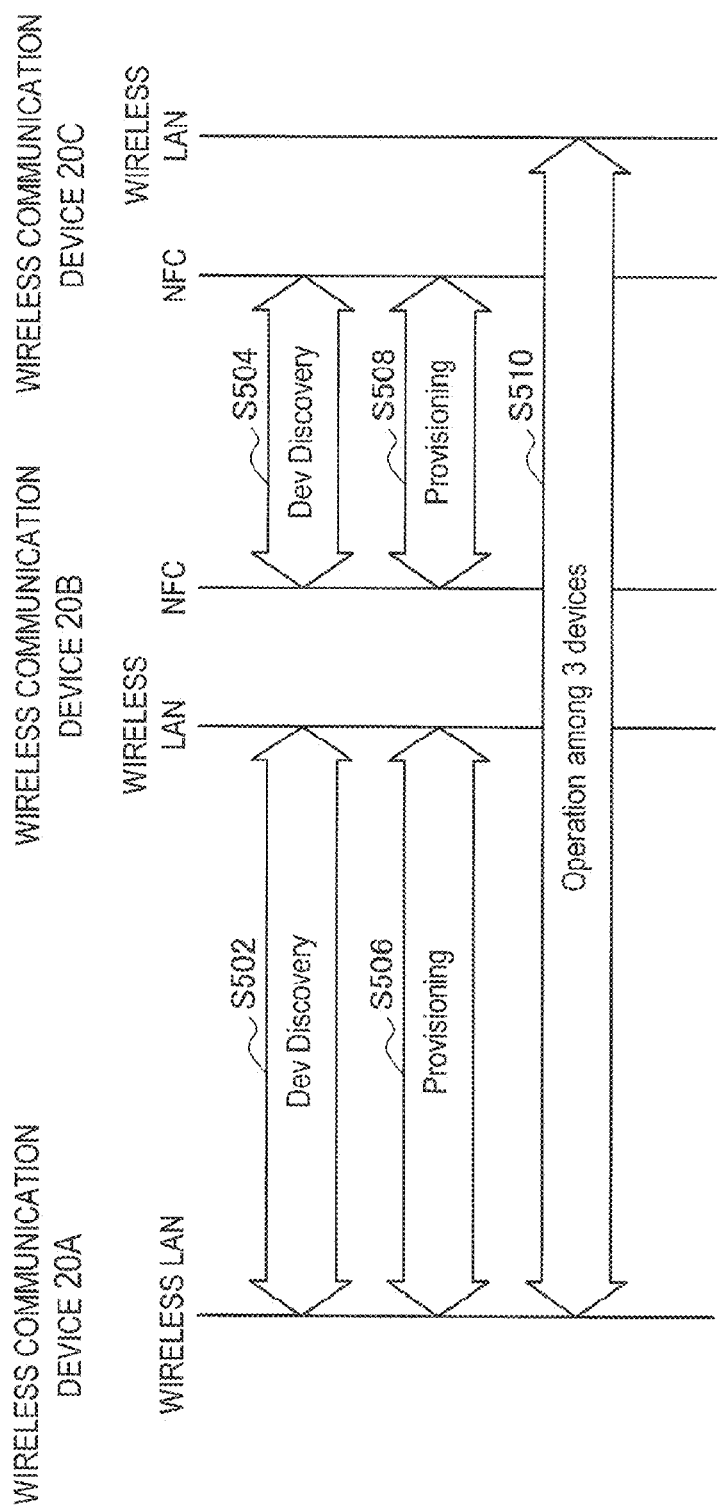
FIG. 13 is an explanatory diagram illustrating a connection procedure according to the second embodiment.

FIG. 13 is an explanatory diagram illustrating a connection procedure according to the second embodiment. As illustrated in FIG. 13, the wireless communication device 20B conducts Device Discovery and Provisioning with the wireless communication device 20A by wireless LAN (S502, S506). At the same time, the wireless communication device 20B conducts Device Discovery and Provisioning with the wireless communication device 20C by NFC (S504, S508). Consequently, the wireless communication device 20A, the wireless communication device 20B, and the wireless communication device 20C are connected.

In this way, according to the second embodiment, it is possible to conduct connection processes for multiple pairs of wireless communication devices 20 in parallel using different communication methods. As a result, the wait time until the connection of three or more wireless communication devices is completed may be shortened.

3. HARDWARE CONFIGURATION

The foregoing thus describes respective embodiments of the present disclosure. The process by the wireless communication device 20 discussed in the foregoing is realized by cooperative action between software, and the hardware of the wireless communication device 20 described below.

Figure 14:
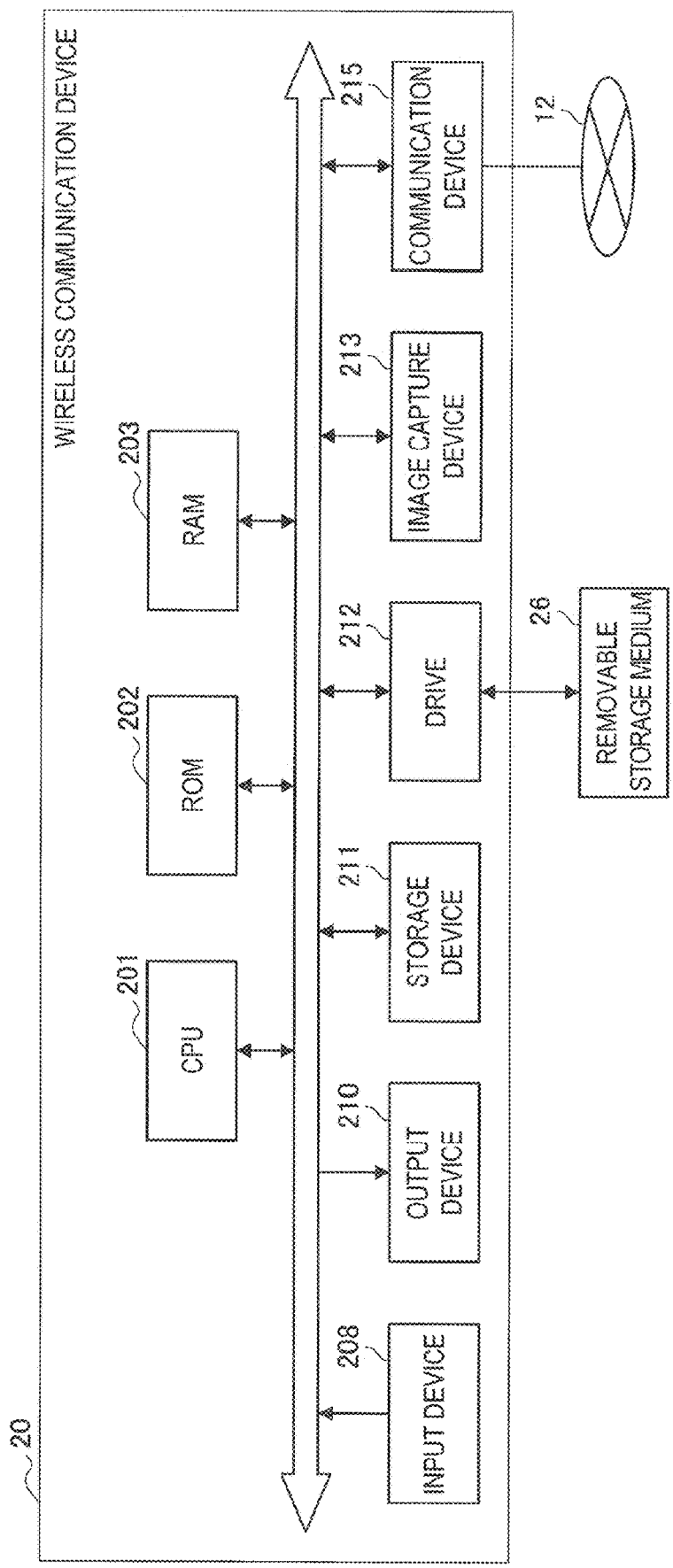
FIG. 14 is an explanatory diagram illustrating a hardware configuration of the wireless communication device 20.

FIG. 14 is an explanatory diagram illustrating a hardware configuration of the wireless communication device 20. As illustrated in FIG. 14, the wireless communication device 20 is equipped with a central processing unit (CPU) 201, read-only memory (ROM) 202, random access memory (RAM) 203, an input device 208, an output device 210, a storage device 211, a drive 212, an image capture device 213, and a communication device 215.

The CPU 201 functions as a computational processing device and control device, and controls overall operation inside the wireless communication device 20 by following various programs. Also, the CPU 201 may be a microprocessor. The ROM 202 stores information such as programs and computational parameters used by the CPU 201. The RAM 203 temporarily stores information such as programs used during execution by the CPU 201, and parameters that change as appropriate during such execution. These components are connected to each other by a host bus realized by a CPU bus, for example.

The input device 208 is made up of an input means by which a user inputs information, such as a mouse, a keyboard, a touch panel, a button, a microphone, a switch, or lever, and an input control circuit that generates an input signal on the basis of input from the user, and outputs to the CPU 201, for example. By operating the input device 208, a user of the wireless communication device 20 is able to input various data and instruct the wireless communication device 20 to perform processing operations, for example.

The output device 210 includes a display device such as a liquid crystal display (LCD) device, an organic light-emitting diode (OLED) device, or a lamp, for example. Additionally, the output device 210 includes an audio output device such as a speaker or headphones. For example, the display device displays captured images, generated images, and the like. Meanwhile, the audio output device converts audio data or the like into sound, and outputs the sound.

The storage device 211 is a device used for data storage, realized as an example of a storage unit in the wireless communication device 20 according to the present embodiment. The storage device 211 may include a storage medium, a recording device that records data to the storage medium, a readout device that reads out data from the storage medium, a deletion device that deletes data recorded to the storage medium, and the like. The storage device 211 stores programs executed by the CPU 201 and various data.

The drive 212 is a reader/writer for a storage medium, and is internally housed inside, or externally attached to, the wireless communication device 20. The drive 212 reads out information recorded to a removable storage medium 26 such as an inserted magnetic disk, optical disc, magneto-optical disc, or semiconductor memory, and outputs such information to the RAM 203. Additionally, the drive 212 may also write information to the removable storage medium 26.

The image capture device 213 is equipped with an image capture optical system such as a photographic lens that condenses light and a zoom lens, as well as a signal conversion sensor such as a charge-coupled device (CCD) or a complementary metal-oxide-semiconductor (CMOS). The image capture optical system condenses light radiating from a subject to form a subject image on a signal conversion unit, and the signal conversion sensor converts the formed subject image into an electrical image signal.

The communication device 215 is a communication interface realized by a communication device or the like that connects to a network 12, for example. Also, the communication device 215 may be a communication device supporting wireless local area network (LAN), a communication device supporting Long Term Evolution (LTE), and a wired communication device that communicates via a wired link.

Note that the network 12 is a wired or wireless transmission channel for information transmitted from a device connected to the network 12. For example, the network 12 may encompass a public network such as the Internet, a telephone network, or a satellite communication network, and various local area networks (LANs) or wide area networks (WANs) including Ethernet (registered trademark). Additionally, the network 12 may also encompass a dedicated network such as an Internet Protocol virtual private network (IP-VPN).

4. CONCLUSION

As described above, if another wireless communication device 20 is detected by the NFC interface 240, the control unit 280 according to the first embodiment controls activation start of the direct communication mode of the wireless LAN interface 220, and in addition, causes the NFC interface 240 to start a connection process for direct communication with the other wireless communication device 20. According to such a configuration, a connection process for direct communication may be conducted in parallel with the activation of direct communication mode, and thus the wait time until connection establishment may be shortened.

In addition, according to the second embodiment, it is possible to conduct connection processes for multiple pairs of wireless communication devices 20 in parallel using different communication methods. As a result, the wait time until the connection of three or more wireless communication devices is completed may be shortened.

The foregoing thus describes preferred embodiments of the present disclosure in detail and with reference to the attached drawings. However, the technical scope of the present disclosure is not limited to such examples. It is clear to persons ordinarily skilled in the technical field of the present disclosure that various modifications or alterations may occur insofar as they are within the scope of the technical ideas stated in the claims, and it is to be understood that such modifications or alterations obviously belong to the technical scope of the present disclosure.

For example, although the foregoing describes an example in which a connection process conducted by wireless communication changes according to the timing when the activation of direct communication mode is completed, the connection process to conduct by wireless communication may be the same, irrespective of the timing when the activation of direct communication mode is completed. In other words, the wireless communication device 20 may conduct a designated connection process by NFC, and after the activation of direct communication mode is completed, conduct the rest of the connection process by wireless communication.

Also, the respective steps in a process of the wireless communication system and wireless communication device 20 in this specification are not necessarily required to be processed in a time series following a sequence described herein as a sequence diagram or flowchart herein. For example, the respective in a process of the wireless communication device 20 may be processed in a sequence that differs from the sequences described herein as a flowchart, and furthermore may be processed in parallel.

In addition, it is also possible to create a computer program causing hardware such as the CPU 201, ROM 202, and RAM 203 built into the wireless communication device 20 to exhibit the same functionality as the respective components of the above wireless communication device 20. Also, a storage medium having such a computer program stored therein is also provided.

(1)

A communication device including:

a contactless communication unit that conducts contactless communication;

a wireless communication unit that conducts wireless communication; and a control unit that, in a case in which the contactless communication unit detects another communication device, controls activation start of a first communication mode of the wireless communication unit, and controls a connection process for the wireless communication between the contactless communication unit and the other communication device.

(2)

The communication device according to (1), wherein after activation of the first communication mode of the wireless communication unit is completed, the control unit causes the wireless communication unit to conduct an unexecuted process from among the connection process.

(3)

The communication device according to (2), wherein the unexecuted process varies according to an activation completion timing of the first communication mode of the wireless communication unit.

(4)

The communication device according to any one of (1) to (3), wherein in a case in which the contactless communication unit detects another communication device while the wireless communication unit is operating in a second communication mode, the control unit controls disconnection of a connection by the second communication mode, and controls activation start of a first communication mode of the wireless communication unit.

(5)

The communication device according to any one of (1) to (4), wherein the second communication mode is an infrastructure mode that conducts communication via an access point, and the first communication mode is a direct communication mode that conducts communication without traversing the access point.

(6)

A communication method including:

detecting another communication device by contactless communication;

starting activation of a first communication mode of wireless communication; and conducting a connection process for the wireless communication with the other communication device by the contactless communication.

(7)
A program for causing a computer to function as:
a contactless communication unit that conducts contactless communication;
a wireless communication unit that conducts wireless communication; and
a control unit that, in a case in which the contactless communication unit detects another communication device, controls activation start of a first communication mode of the wireless communication unit, and controls a connection process for the wireless communication between the contactless communication unit and the other communication device.

(8)
A communication system including:
a plurality of communication devices,
wherein each of the plurality of communication devices includes
a contactless communication unit that conducts contactless communication,
a wireless communication unit that conducts wireless communication, and
a control unit that, in a case in which the contactless communication unit detects another communication device, controls activation start of a first communication mode of the wireless communication unit, and controls a connection process for the wireless communication between the contactless communication unit and the other communication device.

REFERENCE SIGNS LIST 20 wireless communication device
22 wireless antenna
24 NFC antenna
220 wireless LAN interface
240 NFC interface
250 operating unit
260 display unit
270 memory
280 control unit

The invention claimed is:
1. A communication device comprising:
a first wireless communication unit for wireless communication using a first communication method;
a second wireless communication unit for wireless communication using a second communication method; and
a control unit configured to, in a case in which the communication device detects another communication device, start activation of a first communication mode of the second wireless communication unit, and conduct, during the activation of the first communication mode and prior to formation of an active state of the first communication mode, at least a part of a connection process for the wireless communication between the second communication unit and the other communication device using the first communication method, wherein the activation of the first communication mode using the second communication method is performed in parallel with the at least part of the connection process using the first communication method.
2. The communication device according to claim 1, wherein the first wireless communication unit comprises a contactless communication unit and the second wireless communication unit comprises a wireless communication unit.
3. The communication device according to claim 1, wherein the connection process includes a process of deciding which communication device is to operate as a group owner, and an authentication process.
4. The communication device according to claim 1, wherein the control unit is configured to start activation of the first communication mode when the other communication device is detected.
5. The communication device according to claim 1, wherein the first communication mode is a direct communication mode.
6. A communication method performed by a communication device comprising a first wireless communication unit for wireless communication using a first communication method and a second wireless communication unit for wireless communication using a second communication method, the communication method comprising:
detecting another communication device;
starting activation of a first communication mode of the second wireless communication unit; and
conducting, during the activation of the first communication mode and prior to formation of an active state of the first communication mode, at least a part of a connection process for the wireless communication between the second communication unit and the other communication device using the first communication method, wherein the activation of the first communication mode using the second communication method is performed in parallel with the at least part of the connection process using the first communication method.
7. The communication method according to claim 6, wherein the first wireless communication unit comprises a contactless communication unit and the second wireless communication unit comprises a wireless communication unit.
8. The communication method according to claim 6, wherein the connection process includes a process of deciding which communication device is to operate as a group owner, and an authentication process.
9. The communication method according to claim 6, wherein activation of the first communication mode is started when the other communication device is detected.
10. The communication method according to claim 6, wherein the first communication mode is a direct communication mode.
11. A computer-readable storage device encoded with computer-executable instructions that, when executed by a computer, cause the computer to function as:
a first wireless communication unit for wireless communication using a first communication method;
a second wireless communication unit for wireless communication using a second communication method; and
a control unit configured to, in a case in which the communication device detects another communication device, start activation of a first communication mode of the second wireless communication unit, and conduct, during the activation of the first communication mode and prior to formation of an active state of the first communication mode, at least a part of a connection process for the wireless communication between the second communication unit and the other communication device using the first communication method, wherein the activation of the first communication mode using the second communication method is performed in parallel with the at least part of the connection process using the first communication method.

12. The computer-readable storage device according to claim 11, wherein the first wireless communication unit comprises a contactless communication unit and the second wireless communication unit comprises a wireless communication unit.

13. The computer-readable storage device according to claim 11, wherein the connection process includes a process of deciding which communication device is to operate as a group owner, and an authentication process.

14. The computer-readable storage device according to claim 11, wherein the control unit is configured to start activation of the first communication mode when the other communication device is detected.

15. The computer-readable storage device according to claim 11, wherein the first communication mode is a direct communication mode.

* * * * *